Oct. 15, 1929.     J. KOLLER     1,731,536
METHOD OF FORMING A SLIPPER
Original Filed Feb. 20, 1924
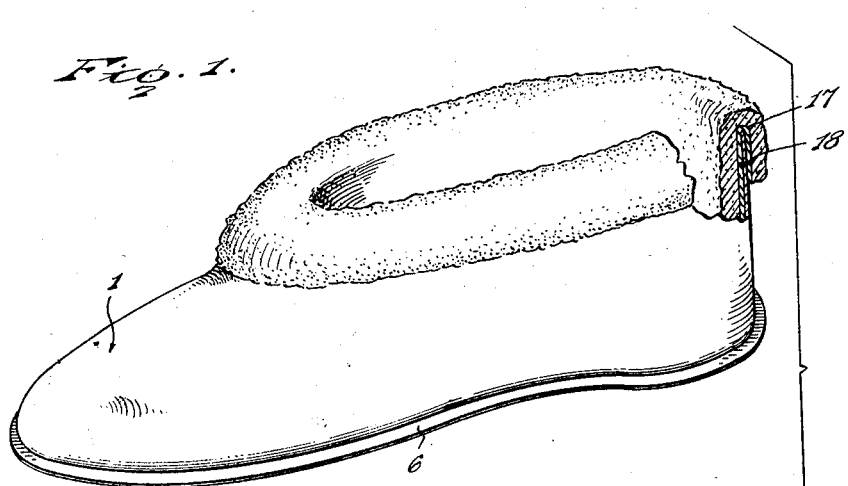
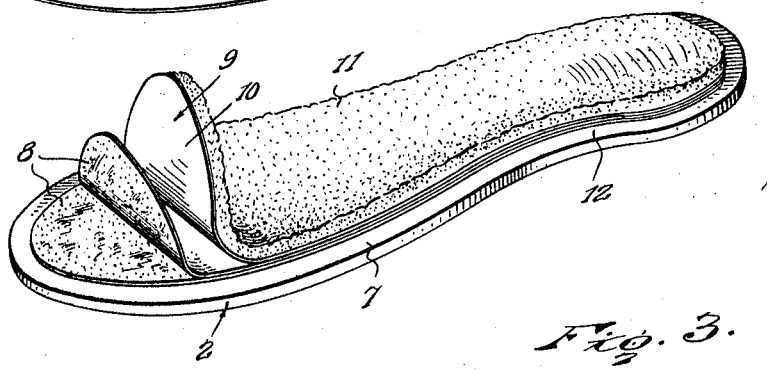
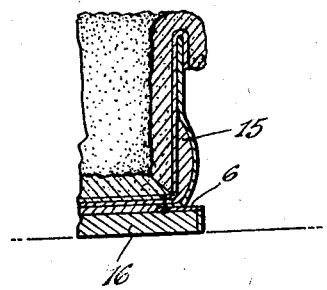
Inventor
J. Koller.
By Lacey & Lacey, Attorneys Patented Oct. 15, 1929

1,731,536

UNITED STATES PATENT OFFICE

JOHN KOLLER, OF JOHNSTOWN, NEW YORK

METHOD OF FORMING A SLIPPER

Original application filed February 20, 1924, Serial No. 694,090. Divided and this application filed February 21, 1928. Serial No. 256,013.

The present invention is directed to a method of forming a slipper or house boot, and is a division of my Patent No. 1,663,376, issued March 20, 1928.

The primary object of the invention is to evolve a novel method of preparing, constructing, arranging, and securing together the several component parts of the slipper or house boot, and particularly the welt, the upper and the insole, and which method will obviate lasting and may be carried out without the employment of special machinery and at an exceptionally low cost.

In the accompanying drawings:

Figure 1 is a perspective view of a slipper constructed in accordance with the present invention, the sole and upper being separated to better illustrate the arrangement of the component parts thereof, and a portion of the upper being broken away and shown in section.

Figure 2 is a detail transverse sectional view.

Figure 3 is a sectional view of the heel portion of a slipper constructed in accordance with the invention, the view illustrating the manner in which the heel may be stiffened by the employment of a counter.

In the drawings, the upper as a whole is indicated in general by the numeral 1, and the sole by the numeral 2. The upper comprises an outer ply of material, indicated by the numeral 3, which material may be leather, felt, cloth or any other material found suitable for the purpose. This outer ply serves as a covering for a second or lining ply which is indicated by the numeral 4. The inner or lining ply which is located inside of the outer ply, is of sheepskin bearing fleece, of fur skin bearing fur, or of any other similar material or skin arranged with the fleece 5 presented inwardly. The skin 4 of the inner ply may be united to the inner surface of the outer ply 3 by means of adhesive, or any other means may be employed for the purpose, and the said inner ply extends over the entire inner surface of the said ply 3, and the lower margins of the two plies 3 and 4 are arranged in exact registration with each other. At this point it may be stated that if found desirable, the outer ply 3 may be omitted, in which event the skin of the inner ply 4 would constitute the outer surface of the upper of the slipper. The inner ply which bears the fleece may consist of any number of pieces or blanks but in any event the pieces are cut to a definite shape and size and are so assembled as to produce the required shape and size, in the finished article. Where the outer ply 3 is employed, it will preferably consist of a single piece, cut to a definite size and shape to fit more or less closely over the inner ply, or it may be formed of a number of pieces, but in any event the inner ply will, by its contour, determine the shape and size of the finished article.

The upper 1 further includes a welt strip 6 of leather or other suitable material of suitable size and thickness secured preferably by stitching to the lower margins or edges of the upper plies 3 and 4. The said lower margins or edges of the upper plies being arranged in registration with the inner edge of the said strip 6.

The top edge of the upper may be finished in any of several ways known in the art, such as by overturning the edge as shown in the drawings, or by binding the edges. Likewise the style of slipper may vary from the higher patterns known as "Romeo" to the lower cut patterns and to the "mules" which latter type has only a toe and ball section and no heel section. Likewise the upper may be made to extend higher in the form of a boot.

The sole 2 comprises a lower ply 7 of relatively stiff leather or other suitable material which is generally of moderate stiffness and thickness, but may vary from a light, flexible sole, to a relatively heavy one of ordinary sole leather. The said sole also comprises a ply 8 of leather, fabric, or other material, or more than one of such plies may be employed, and united together, the ply or assemblage of plies being secured by adhesive to the upper side of the bottom ply of the sole. The sole further comprises a ply 9 which constitutes a lining ply and which is of sheepskin, the skin of the ply being indicated by the numeral 10, and the fleece by the numeral 11 and the said ply being adhesively or otherwise secured to the upper side of the ply 8, the plies 8 and 9 being cut to a definite pattern or contour and being arranged with their edges all in registration. The plies 8 and 9 constitute an insole.

The plies 8 and 9 are cut somewhat smaller than the bottom ply 7 of the sole so that the marginal portion of the said bottom ply 7 projects beyond the edges of the plies 8 and 9, this marginal portion being indicated in the drawings by the numeral 12, and being preferably substantially of a width equal to the width of the welt strip 6 heretofore referred to. Due to this arrangement of the plies comprising the sole of the article, the upper may be assembled with the sole with the welt strip 6 resting flat upon the marginal portion 12 of the bottom ply 7 of the sole and united by stitching or otherwise as indicated by the numeral 13, to the said marginal portion of the ply 7. As stated above, one or more of the plies 8 may be employed in building up the sole, and in any event the combined thickness of the plies 8 and 9, or, more specifically, the thickness of the ply or plies 8 and the thickness of the skin 10 of the ply 9 will exactly equal the combined thicknesses of the plies 3 and 4 and the welt strip 6, or, in the event the ply 3 is not employed in building up the upper, the combined thicknesses of the ply or plies 8 and the skin 10 of the ply 9 will equal the combined thicknesses of the ply 4 and welt strip 6. Likewise in assembling the upper with the sole, the parts having been cut to proper dimensions, the united edges or margins of the plies 3 and 4 and welt strip 6 will exactly abut against and equal in thickness the ply 8 and the skin 10 of the ply 9 as clearly illustrated in Figure 2 of the drawings so that the fleece at the abutting edges of the upper and the insole will likewise exactly abut or meet as clearly shown in the said Figure 2, so that there can be no ridges or other projections which would be liable to cause discomfort to the wearer. In other words, it is as though the insole and the upper and welt strip 6 were in one integral piece instead of being separately formed and assembled with each other.

The lower edges of the ply or plies comprising the upper are united to the inner margin of the welt strip, as previously stated, and preferably by a line of stitching indicated by the numeral 14, and in the course of manufacture it will probably be found that the outside edge of the welt strip 6 and the bottom ply 7 of the sole at its outer edge, will, at one or more points not exactly register with each other, since the exact fitting is made at the inside edge of the welt strip, as above described, and to remedy this the welt strip 6 may be trimmed in the usual manner so as to suitably finish the article.

As illustrated in Figure 3 of the drawings, the upper may also include a counter made of leather, fabric, or other suitable stiffening material indicated by the numeral 15, which counter is inserted between the inner ply 4 and the outer ply 3 at the heel portion as is clearly shown in the said figure. If the outer ply 3 is omitted, then a piece of material, shaped similarly to the counter 15, may be stitched to the back of the outside of the ply 4 and will constitute a pocket to house the stiffening member 15.

In manufacturing slippers or house boots in accordance with the present invention, the procedure is substantially as follows: The sheepskin which is to form the upper or the lining for the upper, as the case may be, and consisting of the skin and fleece having an aggregate thickness of one-fourth inch, more or less, is cut out by means of a die or otherwise to accord with an exact pattern for the upper. The upper may be made of any desired number of sections cut to proper marginal contour by dies or otherwise, and it will be preferable, in all probability, to, for example, cut two sections to be joined at the front and back to constitute the upper, although more than two sections might be designed. The sections or, more specifically, their meeting edges, are united preferably by an ordinary over-stitching machine, and after the upper has been thus far completed, the counter is fastened by adhesive or otherwise in the proper position on the back or outer side of the skin of the sheepskin ply, and is shaped over a heel last. The toe stiffening cap, if one is used, is attached in a similar manner to the outer side of the skin of the sheepskin ply, at the toe portion of the upper. If a covering blank designed to form a pocket as previously described, is employed, it is cut approximately to the required marginal contour by means of a die or otherwise and this may be made in only one section or in several sections as may be found desirable. Where the outer ply 3 of the upper is employed, the sheepskin ply in its formed condition and treated, acted upon, or arranged in the manner just described, and constituting the incomplete upper, is arranged upon a last of the proper size, and the said outer ply, or, more specifically, the material or blank constituting the same, is pulled over it to present a smooth surface and at the same time is secured or united thereto by adhesive. Ordinary, or specially constructed lasts and shaping devices for the heel and toe may be employed in thus shaping the upper. It is to be understood at this point that a last is employed in this step merely as a medium to effect or produce a smooth arrangement of the covering or outer ply and is not employed to determine the shape or size of the slipper. The next step consists in trimming the edge of the covering ply 3 so that the edge when trimmed will exactly register with the sheepskin ply, it being understood that the edge of the sheepskin ply is not in any way trimmed or otherwise acted upon inasmuch as it was initially cut to the precise pattern in a previously described step of the method. The welt strip is next sewed at its inner edge to the lower edge of the upper as an entirety, the stitches passing through both plies of the upper as well as through the said inner edge portion of the welt strip, and while this strip must have proper wedging qualities, such as flexibility, pliability, strength, and a certain degree of thickness, this operation may be performed upon an ordinary machine.

The invention is now concerned with the steps necessary to build up the sole and the first step consists in cutting, nearly to the exact pattern, the main ply 7 of the sole, from relatively stiff material such as flexible sole leather. Next, the several plies 8 and 9 comprising the insole, are cut accurately to a definite pattern, determined by the size of slipper desired, and the plies are arranged one above another with the fleece bearing side of the ply 9 uppermost, and united by adhesive or, otherwise. The built up insole is then placed upon and united by adhesive or otherwise to the main ply 7 at the upper side thereof, the insole being so arranged that its margin will be spaced inwardly from the margin of the ply 7 a uniform distance throughout the entire extent thereof. In assembling the upper and sole, the sole is laid flat and the welt strip 6 is laid in a like manner upon the upper side of the projecting marginal portion 12 of the ply 11 of the sole and in such manner that the edges of the upper will closely contact and abut the edge of the insole, as a whole. This feature of exactly abutting the edges of the insole and the upper is important in determining the shape and size of the slipper. The welt strip is next temporarily fastened in position and then stitched to the ply 7 of the sole by an ordinary machine or one of simple type, and the edges of the sole and the welt are then trimmed evenly and suitably dressed or finished.

The next step of the invention consists in providing the slipper with a heel counter disposed immediately over the rear portion 16 of the sole 2 and which is secured to the portion 16 of the sole of the slipper in the usual manner. In the embodiment of the invention illustrated in the drawings, the upper portion of the upper is overturned as indicated by the numeral 17 so as to expose the fleece of the ply 4 about the foot opening of the slipper, and this overturned upper marginal portion is secured in any suitable manner, as, for example, by stitches 18. This completes the formation of the article. If found necessary, which will be probable, a last may be inserted into the slipper so as to permit of smoothing out of any wrinkles which may be present therein but this last is not employed for the purpose of shaping the slipper or determining the size thereof.

It will be of course understood that the outer ply 3 may be omitted if desired.

Having thus described the invention, I claim:

1. The method of constructing a slipper or house boot which comprises cutting an upper blank of sheepskin to an exact pattern in accordance with the size and shape of the article to be produced, stitching a welt strip to the margin of the said blank, cutting an insole blank to an exact pattern in accordance with the size of the article to be produced, uniting the said welt and the insole to a sole blank, with the said margin of the upper and welt positioned in abutting relation to the margin of the insole.

2. The method of constructing a slipper or house boot which comprises cutting an upper blank of sheepskin to an exact pattern in accordance with the size and shape of the article to be produced, stitching a welt strip to the margin of the said blank, cutting an insole blank to an exact pattern in accordance with the size of the article to be produced, and uniting the said welt and the insole to a sole blank, with the said margin of the upper and welt positioned in abutting relation to the margin of the insole, the steps of uniting the welt to the sole blank consisting in placing the welt on the sole blank and stitching the parts together.

3. The method of constructing a slipper or house boot which comprises cutting an upper blank of sheepskin to an exact pattern in accordance with the size and shape of the article to be produced, stitching a welt strip to the margin of the said blank, cutting an insole blank to an exact pattern in accordance with the size of the article to be produced, uniting the said welt and the insole to a sole blank, with the said upper arranged with its margin in abutment with the margin of the insole, stitching the welt to the said sole, and applying a counter to the heel portion of the upper.

In testimony whereof I affix my signature.

JOHN KOLLER. [L. S.]